Aug. 13, 1935.   J. A. FERGUSON   2,010,983
BORING CHUCK
Filed Dec. 4, 1933

John A. Ferguson
INVENTOR.

BY W. C. Lind
ATTORNEYS.

Patented Aug. 13, 1935

2,010,983

UNITED STATES PATENT OFFICE 2,010,983

BORING CHUCK

John A. Ferguson, West Millcreek Township, Erie County, Pa.

Application December 4, 1933, Serial No. 700,821

1 Claim. (Cl. 279—6)

The present invention is designed to provide a more accurate and convenient chuck for boring tools. With the present invention it is possible to accurately gauge the cut effected with each adjustment of the tool and the cut may be adjusted within very close limits. These adjustments may be accomplished while the head of the chuck is rotating so that it is not necessary to shut down the machine driving the chuck. Features and details of the invention will appear from the specification and claim.

A preferred embodiment of the invention is illustrated in the accompanying drawing as follows:—

Figure 1:
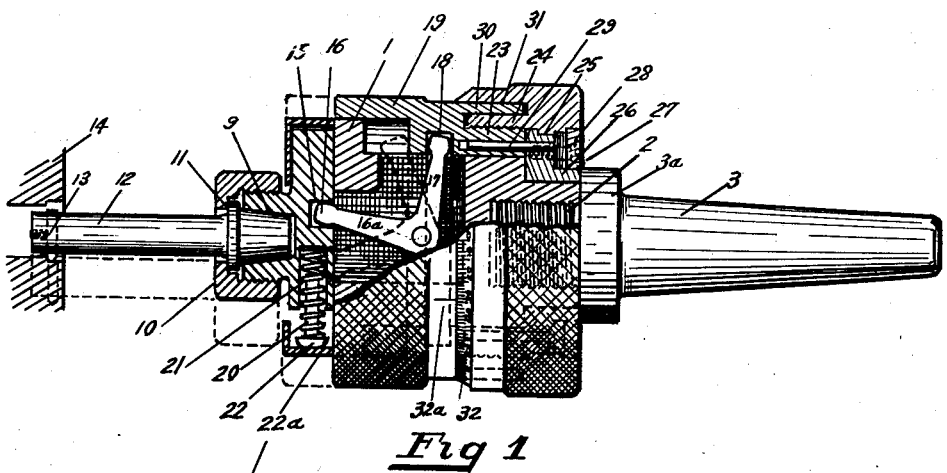

Fig. 1 shows an elevation of the chuck partly in vertical section in a plane through the axis.

Figure 2:
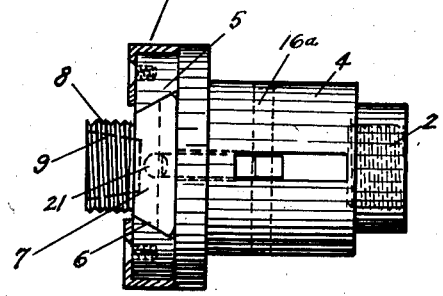

Fig. 2 a detached view of the head.

Figure 3:
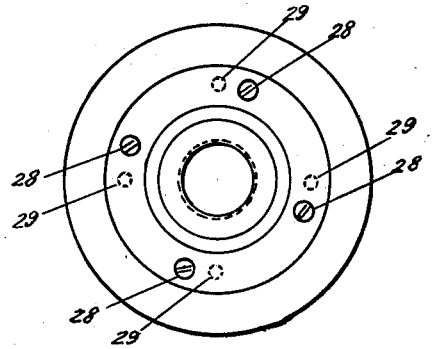

Fig. 3 a rear view of the chuck.

Figure 4:
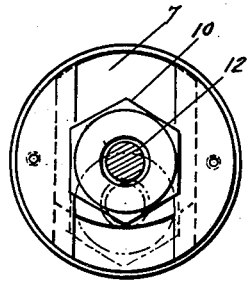

Fig. 4 a front view of the chuck head.

1 marks the head. This has a screw-threaded socket 2 in which a shank 3 is secured. The shank 3 has the usual taper by means of which it may be readily secured in the machine. The head has a guide portion 4 of cylindrical shape and it has an enlarged tool guide projection 5 in which is arranged the under-cut, or dove-tailed guide slot 6. A tool-carrying block 7 is slidingly mounted in the slot 6. It is provided with a screw-threaded projection 8 and a tapered socket 9. A flanged nut 10 is secured on the screw-threaded end 8 and engages a shoulder 11 on a bar 12. The end of the bar is tapered to fit the socket 9. The bar carries a cutting tool 13 which, as shown, is operating in the work 14.

The tool carrying block has a socket 15 in its rear face and this is engaged by an arm 16 of a bell crank lever. The bell crank lever is pivotally mounted on a pin 16a and the opposite arm 17 of the bell crank lever extends into an annular groove 18 in an axially adjustable sleeve 19. The sleeve 19 is rotatively mounted on the guide portion 4 of the head. A spring 20 extends into a socket 21 in the block 7 and engages a headed pin 22. The pin seats on a flanged ring 22a on the projection 5. The sleeve 19 has a screw-threaded projection 23 and a sleeve 24 has an internal screw thread operating on the screw-threaded projection. The sleeve 24 has an annular shoulder 25 on its inner periphery and this engages a slot in a ring 26. A ring 27 is secured on the ring 26 by screws 28 and operates against the outer face of the shoulder 25, thus locking the sleeve 24 with the ring 26. The ring 26 engages a shoulder 3a on the shank so that it is locked against axial movement on the head. Pins 29 lock the sleeve 19 and the ring 26 rotatively together. The sleeve 19 has an annular extension 30 which extends telescopically into a groove 31 in the sleeve 24. The outer faces of the sleeves 19 and 24 have knurled portions so that they may be readily grasped and thus they may be retarded. When the head is rotating and the sleeve 19 rotated relatively to the sleeve 24 and through the screw-threaded connection, the sleeve 19 may be adjusted axially along the head. This adjustment of the sleeve 19 carries with it the arm 17 of the bell crank lever and consequently the arm 16. Thus the tool carrier, or block 7 may be adjusted toward and from the center of the chuck to vary the cut. This adjustment may be a very fine one and the periphery of the sleeve 24 directly over the extension 30 is provided with a scale 32 which operates with relation to markings 32a on the extension. The plate 27 may be adjusted so as to give a slight frictional resistance to a turning movement between the sleeve 24 and 19 and in consequence the adjustment as made will be maintained.

In the operation of the device, the operator simply grasps the two sleeves 19 and 24 and this may be done while the chuck is rotating and by holding one of the sleeves and turning the other a very accurate adjustment of the cutting bar may be effected.

What I claim as new is:—

In a boring chuck, the combination of a head; a tool holder guide on the head; a holder on the guide; a bell crank lever pivoted on the head and engaging the holder; and two sleeves mounted on the head, one sleeve being movable relatively to the head and having an annular groove engaging one arm of the bell crank lever and an axially locked sleeve rotatively mounted on the head and having a screw-threaded connection with the axially movable sleeve, the axially movable sleeve being adjustable axially through a relative rotative movement of said sleeves and said movable sleeve acting on the bell crank lever effecting the adjustment of the holder.

JOHN A. FERGUSON.